United States Patent Office 3,259,188
Patented July 5, 1966

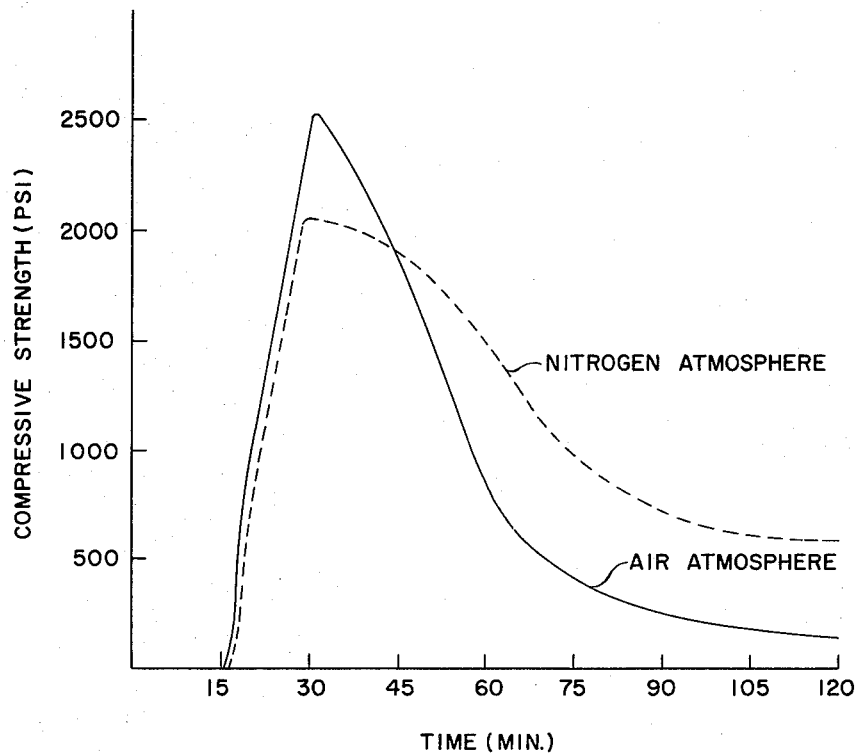

3,259,188
CARBOHYDRATE SAND CONSOLIDATION
Stephen M. O'Brien, Houston, Tex., assignor to Shell Oil Company, New York, N.Y., a corporation of Delaware
Filed Nov. 18, 1963, Ser. No. 324,416
7 Claims. (Cl. 166—25)

This invention relates to well bores formed in earth formations and, more particularly, concerns those drilled into incompetent formations. More particularly, the invention pertains to a method for consolidating incompetent formations penetrated by a well bore so as to inhibit or totally prevent earth particles from being carried into the well bore by effluent, such as petroleum, produced from the earth formation.

Typically in producing effluent from an incompetent earth formation through a well therein, earth particles are carried into the well with resultant collapsing or sloughing of the well bore wall. To avoid this difficulty, various devices have been used to restrict sloughing, such as perforated pipe liners, gravel packs, or tubular screens. Each of these devices and their applications are well known in the well producing art. Such devices, however, have the disadvantage of either becoming plugged with particles after a period of use or of not excluding the finer formation particles intruding into the well. In the latter case, the well becomes plugged with fine formation particles and thus requires cleaning and possible shut-down to maintain productivity. This disadvantage occurs particularly in a dual completion wells where it is relatively very expensive to replace a plugged lever or pack.

To prevent sloughing without the use of the above-mentioned restriction devices, it has been proposed to consolidate incompetent formations by injecting a resin forming material into a portion thereof to act as a binding agent. One of the shortcomings of this method is that it requires the utilization of a large amount of relatively expensive materials to obtain the desired and necessary binding of the formation. As a result, the method is expensive to execute. In addition, in various resin treatments, the permeability of the formation treated may be materially reduced. The latter factor is obviously detrimental, since it decreases the flow area through which effluent may be removed from the formation into the well bore. Another shortcoming of this method is that resins are subject to decomposition when exposed to high temperatures such as are frequently utilized to facilitate the recovery of relatively viscous hydrocarbons. Typically, resins utilized for consolidation purposes decompose and lose mechanical strength at temperatures of about 200° C.

It has also been proposed to consolidate incompetent formations by subjecting them to a temperature which is sufficiently high to melt and fuse the formation constituents, e.g., the silica sand particles. The main disadvantage of this method is that most components of natural subterranean formations fuse at such high temperatures that the method requires the use of temperatures which are considerably above those which can be practically obtained. For instance, if the subterranean formation is one of predominantly silica sand particles, the temperatures required for effecting consolidation by melting and fusing would be in the order of 1500° C. to 1600° C., which is the temperature range in which pure silica melts. Such extremely high temperatures are clearly difficult to produce and even more difficult to maintain for times long enough for the heat to be transferred to a zone of significant size within an earth formation.

Yet another method of consolidating incompetent formations is that of carbonizing liquid hydrocarbons contained therein. In this method, the formation is exposed to elevated temperatures so as to effect carbonization or coking of the hydrocarbons therein. The coke thus formed acts as a binder to hold the formation in an integral consolidated mass. This method has the disadvantage that it requires heating for an extended period to effect thermal decomposition of the hydrocarbons in the formation to the desired form. Another disadvantage of this method is that the presence of oxygen at the temperature of carbonization frequently results in the spontaneous ignition of formation hydrocarbons and/or the coke which had been deposited. The combustion tends to remove the coke and coke-forming materials from the zones adjacent to the well where the coke-binder is most needed.

Still another method heretofore suggested comprises the introduction of a glazing material (e.g., lead oxide) into an unconsolidated formation to effect its consolidation. In this case, the introduction of the glazing material is followed by subjecting the formation to an elevated temperature which fires the glazing substance in order to bind loose particles or grains of the formation into a more solid form. One of the defects of this process resides in the necessity of perforating the glazed substance after firing in order to facilitate production therethrough. This method also has the disadvantage that the glazing substance introduced into the formation does not always uniformly wet the formation aggregates and, therefore, frequently fails to effectively bind the aggregates upon glazing.

Although consolidation methods other than those enumerated above have been developed, one or more of the shortcomings set forth above generally are encountered in the application of these methods. It is, therefore, an object of the present invention to avoid the defects of the prior art processes and to provide an improved method for consolidating loose or incompetent subterranean formations. A more specific object of the invention is to provide a method of consolidating incompetent formations with a relatively inexpensive consolidating agent capable of being easily injected into the formation to form a consolidated portion of high compressive strength without the necessity of extended and high temperature heating. The consolidating agent utilized in the invention is particularly advantageous since it readily wets formation aggregates and is adapted to form a relatively temperature-insensitive particle-binding material at relatively low temperatures without the presence of oxygen. A further specific object of this invention is to provide a process of consolidating incompetent earth formations by treating them with a consolidating agent that is relatively insensitive to the presence of earth formation components, such as clay, that impede their consolidation with resins. Still other objects and advantages will become apparent from the following description in which the present invention will be described by way of illustration and example.

The accompanying drawing diagrammatically illustrates the compressive strengths of samples obtained in an exemplary application of the invention.

Basically, the objects of the present invention are attained by carbonizing a carbohydrate material within an incompetent formation desired to be consolidated. In practice, the method is applied when a well borehole encounters an incompetent subterranean earth formation. In a broad aspect, the method comprises injecting a carbohydrate into the incompetent formation and heating the carbohydrate in situ to carbonize the carbohydrate and thus consolidate the formation into an integral porous unit. The carbohydrate is injected into the formation and in an entrained form within the fluid carrier. Preferably, the type and concentration of the carbohydrate is determined experimentally to produce optimum consolidation and porosity upon carbonization. The degree and type of heating utilized to facilitate carbonization of the carbohydrate should also be chosen to effect optimum consolidation.

Referring now to the inventive method in more detail, the carbohydrate injected into the formation for consolidation may take substantially any form which proves to effectively perform the consolidation function. For example, any type of sugar, such as sucrose, dextrose, etc., starch or hydrolyzed cellulosic material such as carboxy methylcellulose, etc., may be used. The choice of carbohydrate to be used is preferably determined experimentally, as will be developed subsequently.

In application of the method, the carbohydrate is injected into the incompetent formation to be consolidated along with a carrier fluid which entrains the carbohydrate. The carrier fluid may take substantially any form which functions to effectively entrain the carbohydrate therein. For example, readily available fluids, such as water or other solvents for carbohydrates may be effectively used. However, it is generally preferable to use water, rather than other solvents, because of the economic advantage. The fluid carrier used to entrain the carbohydrate should be chosen so that it will readily transport the carbohydrate into the formation upon being injected thereinto. Furthermore, if the carbohydrate is entrained in the carrier in suspended form, the particles of the carbohydrate must be small enough, e.g. colloidally dispersable particles, to penetrate into the incompetent formation. The ideal carrier fluid and carbohydrate composition and concentration comprises a relatively non-viscous solution containing sufficient carbohydrate to form a coke-binder at the boundaries of the grains of the formation without significantly reducing the permeability of the formation. Therefore, the optimum concentration of the carbohydrate varies inversely with the size of the particles in the incompetent formation, since the smaller particles present more surfaces to be coated.

Upon encountering an incompetent formation to be consolidated, the well borehole and fluid injection equipment are arranged and operated to confine the carbohydrate injection to only the incompetent formation therearound. Typically, this is accomplished by setting packers on a tubing injection string in dumbbell fashion, as is well known in the art. More specifically, a tubing string having a closed lower end is run through the borehole and past the incompetent formation. The dumbbell packers of the tubing string are arranged to sealingly-isolate the section of the tubing string adjacent to the incompetent formation from the borehole above and below the formation. The section of the tubing string adjacent to the incompetent formation and sealed from the remainder of the borehole is provided with perforations through which the carbohydrate and entraining fluid may be exhausted from the tubing string and injected into the incompetent formation. With, for example, a "barefoot" completion at the bottom of a borehole, the injection can be accomplished by the "Bradenhead squeeze" technique of establishing a fluid pressure in the annulus around the tubing string sufficient to force fluids pumped through.

It is noted that the aforedescribed tubing string and packer arrangement or other arrangement for selecting the zone into which fluid is injected may be utilized for purposes other than injection of the carbohydrate and its entraining fluid. For example, under certain circumstances it may be found desirable to displace formation fluids from the incompetent formation prior to the injection of the carbohydrate. In the latter case, the tubing string and packer arrangement could be utilized to inject a displacing fluid into the incompetent formation. The arrangement may also be utilized in situations where it is found desirable to inject an agent, such as a catalyst, into the formation prior to the injection of the carbohydrate. Any of the well known catalysts which will facilitate the carbonization of the carbohydrate can be used. It is to be understood that the injection of the displacing fluid and/or catalyst are not generally required in the application of the inventive method and that the desirability of such injections would be determined experimentally. If a catalyst is used it would usually be a nickel, rhodium, copper or chromium compound since these are the materials which increase carbonization in catalytic crackers and which appear to have some more free effects in this process.

After the carbohydrate has been injected into the incompetent formation to the desired degree, the carbohydrate is heated to a temperature sufficient to carbonize the carbohydrate. Upon carbonization, the carbohydrate injected into the formation functions to cement the granular aggregates of the formation together at their contact points, thus forming an integral porous mass. It is noted that carbohydrate solutions, such as aqueous solutions of sucrose or other sugars function particularly effectively, since such solutions readily wet the formation aggregates on their surfaces and contact points. However, the effective results are also possible if the carbohydrate is introduced into the formation in a finely dispersed form capable of penetrating into the granular formation.

Heating of the carbohydrate injected into the formation can be accomplished by any of the means well known to those skilled in the art. For example, the incompetent formation may be heated with a borehole heater located in the borehole adjacent to the formation, through means of in situ combustion initiated in the borehole. The choice of the type of the heating means utilized is dependent largely upon its availability and the side effects, other than heating, that it has upon the formation being heated. In the latter respect, it is noted that in situ combustion heating in the borehole after the injection of the carbohydrate typically involves the possibility that the relatively high velocity flow of gas may displace some or all of the carbohydrate. Downhole heaters are particularly effective where the formation is heated after the carbohydrate has been injected. Specifically, with the use of a downhole heater no chemicals need be introduced into the formation and the possibility of destroying any of the coke-binding material by an in situ combustion can be avoided by heating in the absence of oxygen. In the latter respect, it is noted that the method of the present invention has the advantage that the carbohydrates utilized therein may be carbonized to effect consolidation in the absence of oxygen.

The temperature to which the formation is heated to effect the consolidation method of the present invention and the duration of heating varies with the specific application of the invention. Typically, the temperature of the formation in the area to be consolidated is heated to between 400 and 600° F. for a period of from 6 to 48 hours. The exact temperature to which the formation is to be heated to effect consolidation is dependent primarily on the type of carbohydrate to be carbonized. The duration of the heating is determined by the depth of the formation to be heated, the temperature produced within the heater and the heat losses anticipated during heating. The temperature required to effect consolidation can be determined either experimentally, as will be developed subsequently, or through estimation based on the known characteristics of the carbohydrate. The duration of heating can be determined by estimating the heat losses to the formation through means well known to those skilled in the geophysical arts.

In addition to controlling the temperature of the formation during carbonization of the carbohydrate, it may frequently be desirable to control the pressure maintained within the well. The most obvious reason for maintaining this pressure is to assure that the carbohydrate and its carrying fluid will remain in the formation and close to the well during the heating, rather than flow back into the borehole, or further out into the formation, due to the pressure differential which may exist between the borehole and the incompetent formation. The carbohydrate consolidating agent will function with optimum results when the pressure within the borehole exactly balances that within the formation. Control of its pressure within the borehole is effected most conveniently through utilization of the same tubing string and packer or other arrangement utilized for injection of the carbohydrate and its carrying fluid.

From the foregoing discussion it can be seen that the practice of the present invention involves many variables, some of which can be controlled to optimize consolidation and the others of which are fixed. For example, it is possible to control the carbohydrate material and concentration, the carrier fluid, the temperature and duration of heating, the type of heating, the pressure maintained during heating, and the area to be treated. However, other factors, upon which the variable factors are in large part dependent cannot be altered. These fixed factors include such things as the structure of the formation to be consolidated and the structure of the formations adjacent thereto. The latter characteristics are particularly significant in determining the heat losses on the formation and, as a result, the duration of heating required to effect carbonization.

The optimum application of the present invention in consolidating an incompetent formation encountered by a well borehole may be determined by employing a variety of experimental techniques. For example, the incompetent formation may be cored to obtain core samples which may be utilized to apply the inventive method thereto on a laboratory scale. In the laboratory, the core sample, or preferably samples, could be subjected to the injection of various carbohydrates and these carbohydrates could be carbonized under varying conditions of temperature and pressure. The laboratory test can also be extended to determine the effects of other variables that may be controlled in the application of the invention, such as the presence of oxygen or other gas, the presence of a catalyst, and the type of carrier used to inject the carbohydrate into the formation. As an alternative, similar tests could be conducted upon artificially prepared samples which are constructed of inorganic particles having characteristics corresponding to those of the formation desired to be consolidated and containing therein kinds and amounts of oil corresponding to those present in the formation. In another alternative, tests to determine consolidation by the method of the invention may be conducted in situ in the formation surrounding a well bore by subjecting portions of the formation to various injections of carbohydrates and heating processes corresponding substantially to those that could be produced in the laboratory. In the latter alternative method, the results of the tests may be determined by sidewall coring of the formation or by producing a fluid from the well in determining whether aggregates of the incompetent formation are sloughing into the well.

It is noted that the aforementioned experimental techniques are merely intended to be exemplary of those which might be utilized in the application of the invention and that other tests or variations of these tests which yield corresponding information as to the effectiveness of consolidation could equally well be used. Furthermore, any of the tests can be used to determine if a single application of the method of the invention will effect the desired degree of formation consolidation. If the desired consolidation is not effected by a single application of the method, the tests can be extended to determine the effect of repeating the method to effect additional consolidation. From tests, such as those described in the previous discussion, it is possible to determine all of the variables to be utilized in actual application of the invention to produce optimum consolidation. Certain of these variables, such as the carbohydrate to be utilized, are determined directly from the results of the tests. Other of the variables, particularly the quantitative ones, such as the volume of carbohydrate to be injected, may be readily calculated. It is noted that the quantitative determinations are dependent to a large degree on the size of the formation to be treated and the formations adjacent to the treated formation. These geophysical characteristics may be determined through any of the means well known to those skilled in the art, such as through various logging devices that may be lowered into the well borehole.

*Example I*

Referring now to the accompanying drawing, therein is illustrated a pair of curves representing the compressive strengths of samples of sand consolidated according to the method of the invention. The samples represented by the curves compose a mixture of Ottawa sand and a 40% aqueous liquid saturation of 50% sugar solution. Each of the samples was heated at a temperature of 600° F. for the times shown on the abscissae and compressive strengths of the sample at various heating times were determined as represented by the ordinate. In the drawing, the solid line represents the values obtained when the samples were heated in an atmosphere of air, while the dashed line represents those obtained when air was excluded. The exclusion of air was effected by placing the samples in a vacuum desiccator, pumping out the air, and then flushing with nitrogen. After being so treated, the samples were removed and wrapped in heavy-duty aluminum foil to exclude air.

From the results illustrated by the curves, it can be seen that all of the consolidated samples had considerable strength and that maximum strength was achieved after a heating time of approximately 30 minutes. Upon reaching the point of maximum strength after about 30 minutes of heating, the compressive strength of the samples gradually decreased with increased periods of heating until they approached a nearly constant level at about 120 minutes. It is noted that at longer heating time the samples prepared in the absence of air had a greater compressive strength than those prepared in the presence of air. This difference is most probably due to the fact that when oxygen is present the bonding material is continually weakened by the loss of carbon as carbon oxide products. The decrease in strength in the absence of air suggests that the binding material originally formed is different from that that remains after an extended heating period. It is probable that the material of higher bonding strength contains some hydrogen and oxygen which are stripped away as pyrolysis continues.

Consolidated samples corresponding to those utilized in the test diagrammatically illustrated in the accompanying drawing have been subjected to a variety of solvent tests including hot and cold water, chloroform, acetone and alcohol. None of these solvents effected samples produced at heating periods of 90 minutes or more. At lower heating times, the solvents became slightly discolored, but no slumping of the consolidated sand occurred.

In addition to testing samples corresponding to those used in the compression tests of the accompanying figure with solvents, tests have also been made to determine the permeability of these samples. The latter tests indicate a permeability of greater than 5 darcies for the Ottawa sand. Thus, it can be seen that sand so consolidated is well adapted to facilitate the production of hydrocarbons therethrough without the necessity of fracturing subsequent to consolidation.

*Example II*

A sample was obtained from an incompetent, oil-bearing, quartz sand typical of incompetent reservoir formations encountered in California. This sand has a total clay content of about 25% by weight, 15% illite, less than 5% each of kaolinite and chlorites, and 5% expandable clays.

A portion of the above sand was packed into a tube and permeated with a water solution containing 50% by weight of sucrose. The liquid-impermeated sand was heated at 600° F. for 45 minutes, to carbonize the carbohydrate in-situ.

The carbonization of the carbohydrate firmly consolidated the sand. The permeability of the consolidated sand, before and after washing with toluene, was 1.2 darcies.

The clay content of this sand is typical of that of clayey, incompetent earth formations in which it is difficut, if not impossible to attain a consolidation with resin forming materials that are widely used in "cleaner" sands. For example, treating such a clayey sand with a solution containing the resin forming components of the epoxy-amino resins, or with the resin forming components of the phenolformaldehyde, or ureaformaldehyde resins, consistently produces only a crumbly mass of tacky sand grains.

Although the foregoing examples are merely intended to be illustrative of the effectiveness of the invention, it is believed clear that the observations of these examples point out the value of the invention for consolidating incompetent formations. Tests, such as those conducted in the aforediscussed examples, may be carried out on actual formation core samples or on simulated samples to accurately determine the effects of the inventive method in a particular formation. These tests may also be extended to determine the optimum application of the invention, as has been developed in detail in the previous discussion.

To conclude, the present invention provides an improved novel method for effectively consolidating incompetent formations. The invention is particularly advantageous in that it can be quickly affected at relatively low temperatures and that the materials required for its application are relatively inexpensive. It is noted that the invention is not intended to be limited to the characteristics defined in the examples. For example, the carbohydrate consolidating agent may be any of those enumerated in the previous discussion and the temperatures of carbonization may be varied as the circumstance dictates. Furthermore, in treating a well from which sand has been produced, thus leaving a cavern adjacent to an incompetent formation, the carbohydrate consolidating agent may be introduced in the form of a relatively viscous aqueous carrier liquid for gravel packing material. In such an operation the carbohydrate may comprise an aqueous sugar or starch solution containing dispersed starch particles both above and below the colloidal sizes as well as the grains of the gravel pack. During the placement of the pack, for example by conventional gravel packing procedures, some carbohydrate is transported into the formation and some is retained in the pack. A subsequent heating of the pack and treated formation carbonizes the carbohydrate to consolidate both the pack and the formation. Alternatively the gravel pack could be introduced separately into the borehole and subsequently flooded with a fluid having carbohydrates entrained therein. Thereafter the gravel pack, saturated with the fluid, can be heated to consolidate it into a porous liner contiguous to the side of the borehole. In this alternative procedure, the viscous aqueous carrier liquid would not also contain the carbohydrates.

I claim as my invention:

1. An improved method of consolidating loose particles of earthen formations in subterranean reservoirs penetrated by a borehole which gives superior consolidation integrity comprising:
    (a) injecting into portions of said reservoir to be consolidated a fluid having a carbohydrate entrained therein; and
    (b) subsequently heating said portions of said reservoir in the absence of oxygen to a temperature sufficient to carbonize said carbohydrate while balancing the differential pressures between the borehole and said portion of said reservoir being consolidated to consolidate said loose particles in said reservoir into a permeable mass.

2. A method according to claim 1 wherein the fluid is aqueous and the carbohydrates entrained therein are mixtures.

3. A method according to claim 1 wherein the fluid is aqueous and the carbohydrate entrained therein is sugar.

4. A method according to claim 1 wherein the fluid is aqueous and the carbohydrate entrained therein is starch.

5. A method according to claim 1 wherein the fluid is aqueous and the carbohydrate entrained therein is a hydrolyzed cellulosic material.

6. A method according to claim 1 wherein the formation having the fluid injected thereinto is heated to a temperature of between 400° and 600° F.

7. An improved method of reducing sand intrusion into boreholes penetrating unconsolidated reservoirs comprising:
    (a) gravel packing at least a portion of said borehole which penetrates said unconsolidated reservoir;
    (b) injecting into said gravel packed portion of said borehole a fluid having carbohydrates entrained therein, said carbohydrates being present in an amount sufficient to bond said gravel pack into a permeable mass upon carbonization of said carbohydrate; and
    (c) subsequently heating said gravel pack in the absence of oxygen to a temperature sufficient to effect carbonization of said carbohydrates while balancing the differential pressure between the borehole and said unconsolidated reservoir surrounding said gravel pack.

References Cited by the Examiner

UNITED STATES PATENTS

| | | | |
|---|---|---|---|
| 2,941,594 | 6/1960 | Ladd et al. | 166—12 |
| 3,003,555 | 10/1961 | Freeman et al. | 166—39 X |
| 3,024,840 | 3/1962 | Allen | 166—11 |
| 3,055,423 | 9/1962 | Parker | 166—25 X |
| 3,070,159 | 12/1962 | Marx | 166—25 X |
| 3,072,188 | 1/1963 | Morse | 166—25 |
| 3,072,204 | 1/1963 | Brown | 166—15 X |
| 3,115,930 | 12/1963 | Bernard | 166—33 |
| 3,134,435 | 5/1964 | Wyllie | 166—39 X |
| 3,147,805 | 9/1964 | Goodwin et al. | 166—25 |
| 3,163,218 | 12/1964 | Allen et al. | 166—25 |
| 3,198,249 | 8/1965 | Willman | 166—4 |

CHARLES E. O'CONNELL, *Primary Examiner.*

I. A. CALVERT, S. J. NOVOSAD,
*Assistant Examiners.*